(12) United States Patent
Miller

(10) Patent No.: US 7,035,805 B1
(45) Date of Patent: Apr. 25, 2006

(54) SWITCHING THE MODES OF OPERATION FOR VOICE-RECOGNITION APPLICATIONS

(76) Inventor: Stephen S. Miller, 8 Gramercy Park South-Apt. 6K, New York, NY (US) 10003

( * ) Notice: Subject to any disclaimer, the term of this patent is extended or adjusted under 35 U.S.C. 154(b) by 625 days.

(21) Appl. No.: 09/631,239

(22) Filed: Aug. 2, 2000

Related U.S. Application Data

(60) Provisional application No. 60/218,350, filed on Jul. 14, 2000.

(51) Int. Cl.
*G10L 21/00* (2006.01)
(52) U.S. Cl. .................................................. 704/275
(58) Field of Classification Search ............ 704/270, 704/275, 235, 260; 367/132; 473/459; 345/169; 455/575.2
See application file for complete search history.

(56) References Cited

U.S. PATENT DOCUMENTS

| | | | | |
|---|---|---|---|---|
| 5,377,303 A | * | 12/1994 | Firman | 704/275 |
| 5,555,533 A | * | 9/1996 | Peck | 367/132 |
| 5,960,447 A | * | 9/1999 | Holt et al. | 704/270 |
| 6,012,995 A | * | 1/2000 | Martin | 473/459 |
| 6,266,635 B1 | * | 7/2001 | Sneh | 704/275 |
| 6,288,709 B1 | * | 9/2001 | Willner et al. | 345/169 |
| 6,470,197 B1 | * | 10/2002 | Tuoriniemi et al. | 455/575.2 |
| 6,581,033 B1 | * | 6/2003 | Reynar et al. | 704/270 |
| 2003/0028382 A1 | * | 2/2003 | Chambers et al. | 704/275 |

* cited by examiner

*Primary Examiner*—David D. Knepper
(74) *Attorney, Agent, or Firm*—Shemwell Mahamedi LLP

(57) ABSTRACT

A system and method for switching between the command-mode of operation and the text-mode of operation in voice-recognition systems. The system operates using voice-recognition software and a mechanical switch which together enable the system to differentiate between spoken commands that are used to operate the system and spoken words that are inserted as text into a software application. The mechanical switch can be added to a conventional computer mouse, hand-held or desk-mounted microphone, personal digital assistant such as a Palm Pilot, or any other apparatus either used with or having a microphone. Alternatively, the system and method can be implemented using software alone without a mechanical switch, i.e., an electronic switch, wherein a specialized word or words are used to command the system to switch between the command-mode and the text-mode. Such an electronic switch can be implemented in a mouse, microphone or electronic organizer in addition to or in lieu of any mechanical switch such apparatus may contain.

18 Claims, 4 Drawing Sheets

SWITCHING THE MODES OF OPERATION FOR VOICE-RECOGNITION APPLICATIONS

PRIORITY NOTICE

This Non-Provisional U.S. patent application claims the benefit of the Jul. 14, 2000 filing date of Provisional U.S. Patent Application Ser. No. 60/218,350.

FIELD OF THE INVENTION

The present invention relates to voice recognition systems, and more particularly to a system and method for enabling such systems to differentiate between spoken system commands and spoken text for literal insertion into a software application.

BACKGROUND OF THE INVENTION

Voice-recognition systems are gradually becoming an effective replacement for keyboards used in computing systems. In a typical voice recognition system, the user installs a voice recognition software, then trains the system to recognize his or her voice. Thereafter, instead of using a keyboard to input commands and/or text to the system, the user speaks into a microphone that is typically worn either as a headset or extends from a pedestal on the user's desk. Current examples of voice-recognition software include IBM's "ViaVoice," Lernout & Hauspie's "VoiceXpress," and Dragon System's "Dragon NaturallySpeaking."

A significant problem encountered in conventional voice recognition systems is the "text-mode/command-mode" problem in which such systems have difficulty knowing whether to interpret the user's words as system commands or insertable text. For example, if while using Microsoft Word the user says "open Web browser," voice recognition systems have difficulty knowing whether the user wants to open a Web browser as a separate application, or insert text into a Microsoft Word document. Conventional voice recognition systems' solution to this problem is the "command phrase dictionary" by which the system listens for certain exact command phrases which are interpreted as commands rather than text. However, the "command phrase dictionary" approach has several drawbacks. One significant drawback is that it makes the voice recognition system much harder to learn and use. Instead of letting the user use natural language to command the voice recognition system, it requires the user to memorize many command phrases, some of them unnatural, before he or she can use the system effectively. The reason "command phrase dictionaries" must often use unnatural language is that the most obvious phrases may be commonly used in dictated text. For example, some systems require a user to say "scratch that" rather than "delete" in order to delete a phrase, and "microphone off", rather than "turn the microphone off" or "mike off", in order to turn off the microphone. Incorrect command phrases will often be interpreted as text for insertion.

Another drawback of the "command phrase dictionary" approach is that, because there is no standard command phrase dictionary among competing voice-recognition system providers, a user must learn multiple command phrase dictionaries if he/she is using different voice recognition systems. Yet another drawback is that the "command phrase dictionary" approach makes the voice recognition system slower. When the voice recognition system hears any word that might be the start of a command phrase, the system must wait to hear the entire phrase before it knows whether or not the user's words are intended as text-mode or command-mode.

It is therefore an object of the present invention to provide a system and method for use in a voice recognition system that will enable the system to know before a user speaks whether the spoken words are to be interpreted as system commands or insertable text. It is also an object of the present invention to provide a system and method that will enable users to issue commands using natural language rather than having to memorize specific command phrases, thereby eliminating the problem of non-standardized "command phrase dictionaries" posed by competing voice recognition systems. Thus, it is an object of the present invention to make voice-recognition systems easier and faster to use than conventional voice-recognition systems.

SUMMARY

A system and method for switching between the command-mode of operation and the text-mode of operation in voice-recognition systems. The present invention is implemented using software and a mechanical switch, wherein the switch can be implemented in a computer mouse, a microphone, or a remote device that combines the functionality of both a computer mouse and a microphone. When depressed in a first manner, this switch engages the voice-recognition system in the text-mode, and when depressed in a second manner it engages the voice-recognition system in the command-mode. Alternatively, the present invention can be implemented using software alone without a mechanical switch, i.e., a software switch, wherein spoken commands switch the voice-recognition system between the command-mode and the text-mode.

DETAILED DESCRIPTION OF THE INVENTION

Figure 1:
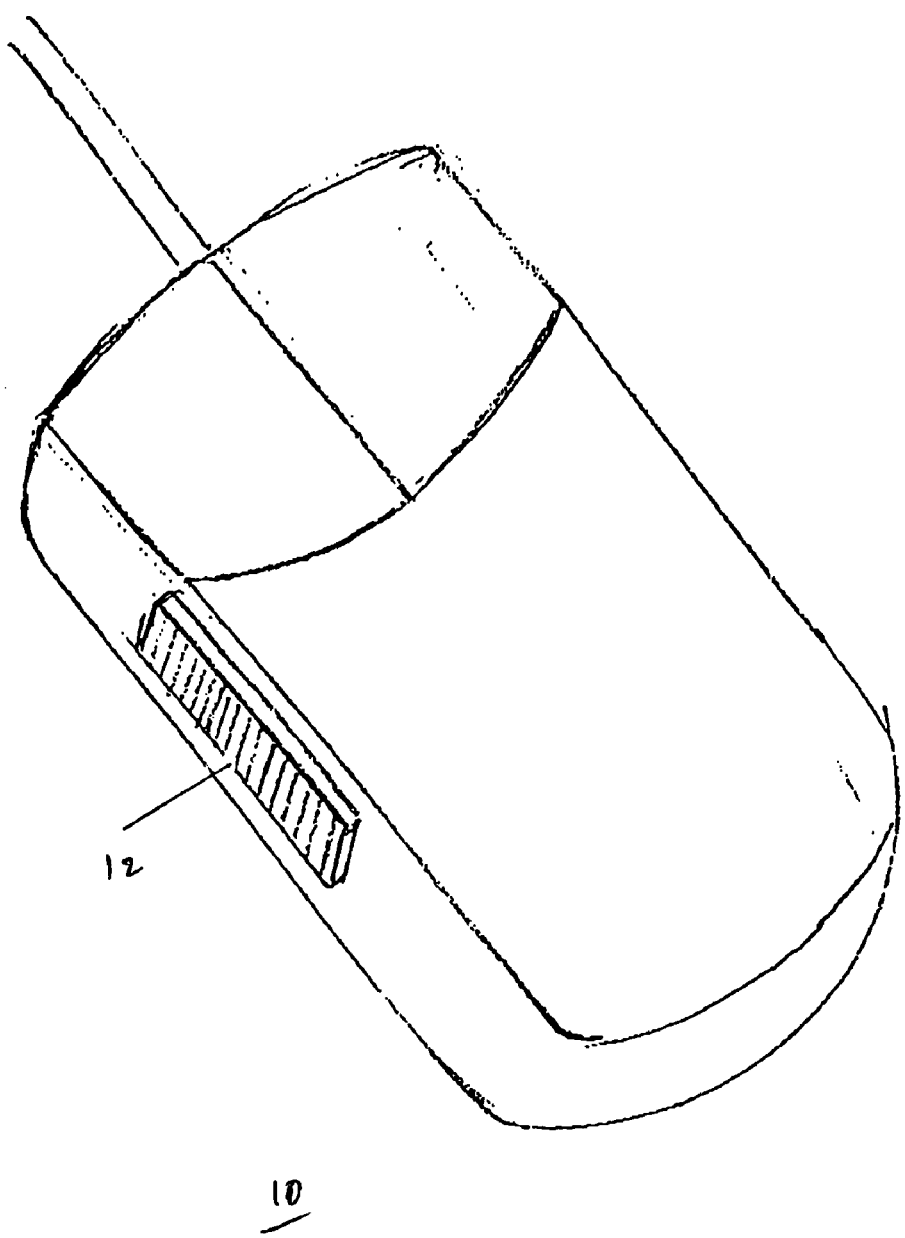
FIG. 1 shows a first exemplary embodiment of an apparatus for switching between the command-mode of operation and the text-mode of operation in a voice-recognition system.

The present invention is a system and method for switching between the command-mode of operation and the text-mode of operation in voice-recognition systems. The system of the present invention is comprised of voice-recognition software and an apparatus for selectively switching between the command-mode and the text-mode. FIG. 1 shows a first exemplary embodiment of an apparatus 10 for switching between the command-mode and the text-mode in voice-recognition systems according to the present invention. Apparatus 10 is implemented as a computer mouse which can be fabricated in any shape, have any number of mouse buttons, and have a page up/down scroll wheel between two of the buttons. Apparatus 10 is used with a microphone which is not shown and into which a user speaks. This microphone may or may not have a command-mode/text-mode switch to operate a computer, and can be any type of microphone such as a handheld, desk-mounted or headset microphone, or a remote combination microphone-mouse/cursor control device. Alternatively, the microphone may be implemented on apparatus 10. Apparatus 10 is coupled to a computer by a cable. Alternatively, apparatus 10 can be a wireless device that operates a computer at any frequencies permitting wireless communications.

Apparatus 10 includes a mechanical command-mode/text-mode switch 12 for switching between the command-mode and the text-mode of operation. Switch 12 is a spring-controlled slide-switch that can be slidably moved and is positioned on the left side of the mouse where it can easily be controlled by a user's thumb. Switch 12 is a three-mode switch having three operating positions. The first position is the default position, wherein switch 12 is centered between the command-mode position and text-mode position. When switch 12 is in the default position the microphone is turned off. If the user uses his thumb to push switch 12 forward towards the mouse-buttons end of the mouse, the microphone is turned on in the command-mode. Thereafter, when the user releases switch 12, it automatically slides back to the default center position and the microphone is turned off. If the user uses his thumb to pull switch 12 backwards towards the rear end of the mouse, the microphone is turned on in the text-mode. Thereafter, when the user releases switch 12 it automatically slides back to the default center position and the microphone is turned off. Alternatively, the operating positions of switch 12 can be altered from those described above.

In an alternative embodiment of apparatus 10, command-mode/text-mode switch 12 can be implemented as a two-mode switch having two operating positions, i.e., command-mode and text-mode, with a separate control element being used to turn the microphone on and off. In yet another alternative embodiment of apparatus 10, command-mode/text-mode switch 12 can be implemented using at least one button and/or at least one touch-sensitive touch pad, which button and/or touch pad can be positioned anywhere on the mouse.

Figure 2:
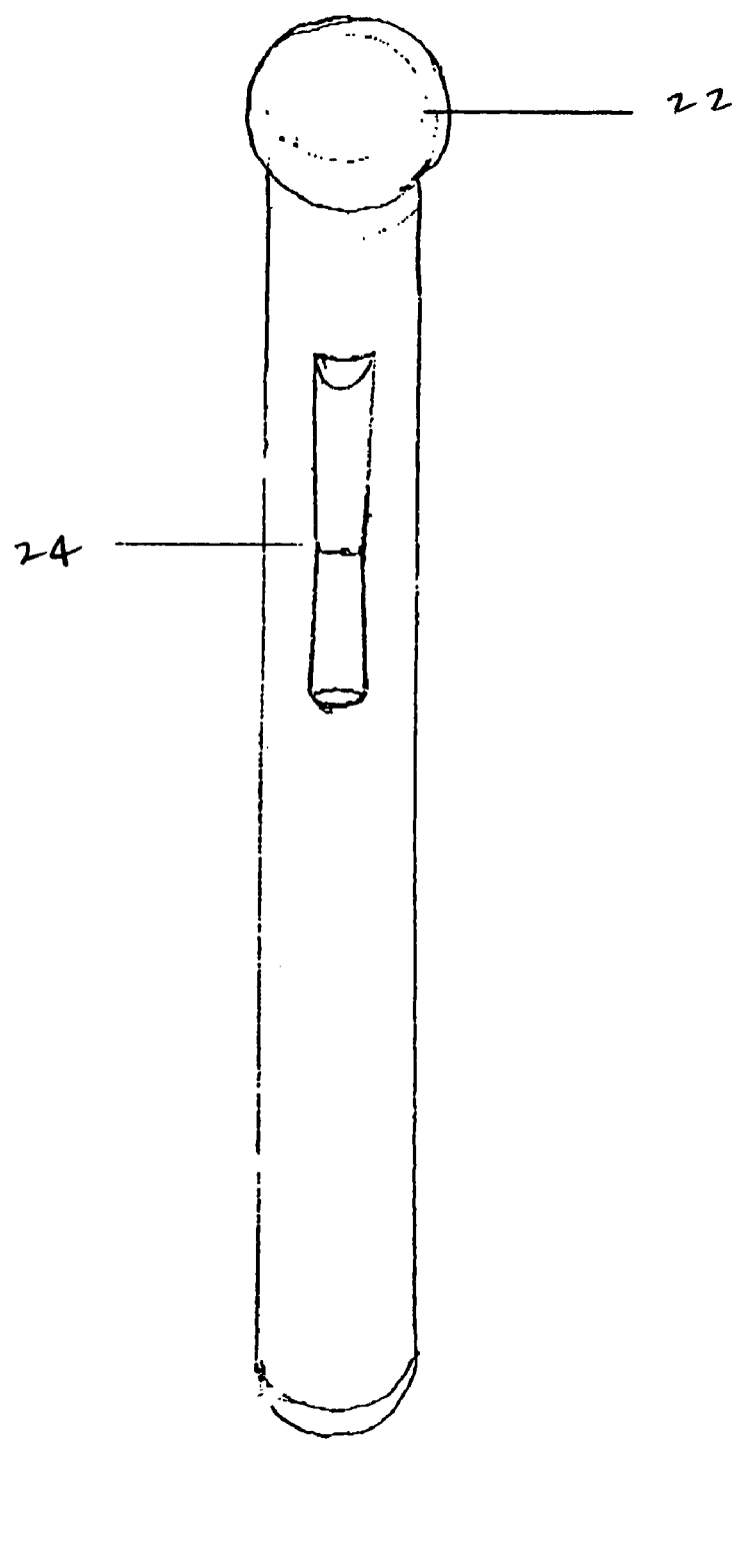
FIG. 2 shows a second exemplary embodiment of an apparatus for switching between the command-mode of operation and the text-mode of operation in a voice-recognition system.

FIG. 2 shows a second exemplary embodiment of an apparatus 20 for switching between the command-mode of operation and the text-mode of operation in voice-recognition systems according to the present invention. Apparatus 20 is implemented as a microphone which can be shaped like any hand-held or desk-mounted microphone and can have any number of buttons. Apparatus 20 is used with a mouse which is not shown and which may not have a command-mode/text-mode switch to operate a computer. Apparatus 20 is coupled to a computer by a cable. Alternatively, apparatus 20 can be a wireless device that operates a computer at any frequencies permitting wireless communications. Apparatus 20 includes a microphone 22 into which a user speaks and a command-mode/text-mode switch 24 that works in a similar manner to command-mode/text-mode switch 12 described above.

Figure 3:
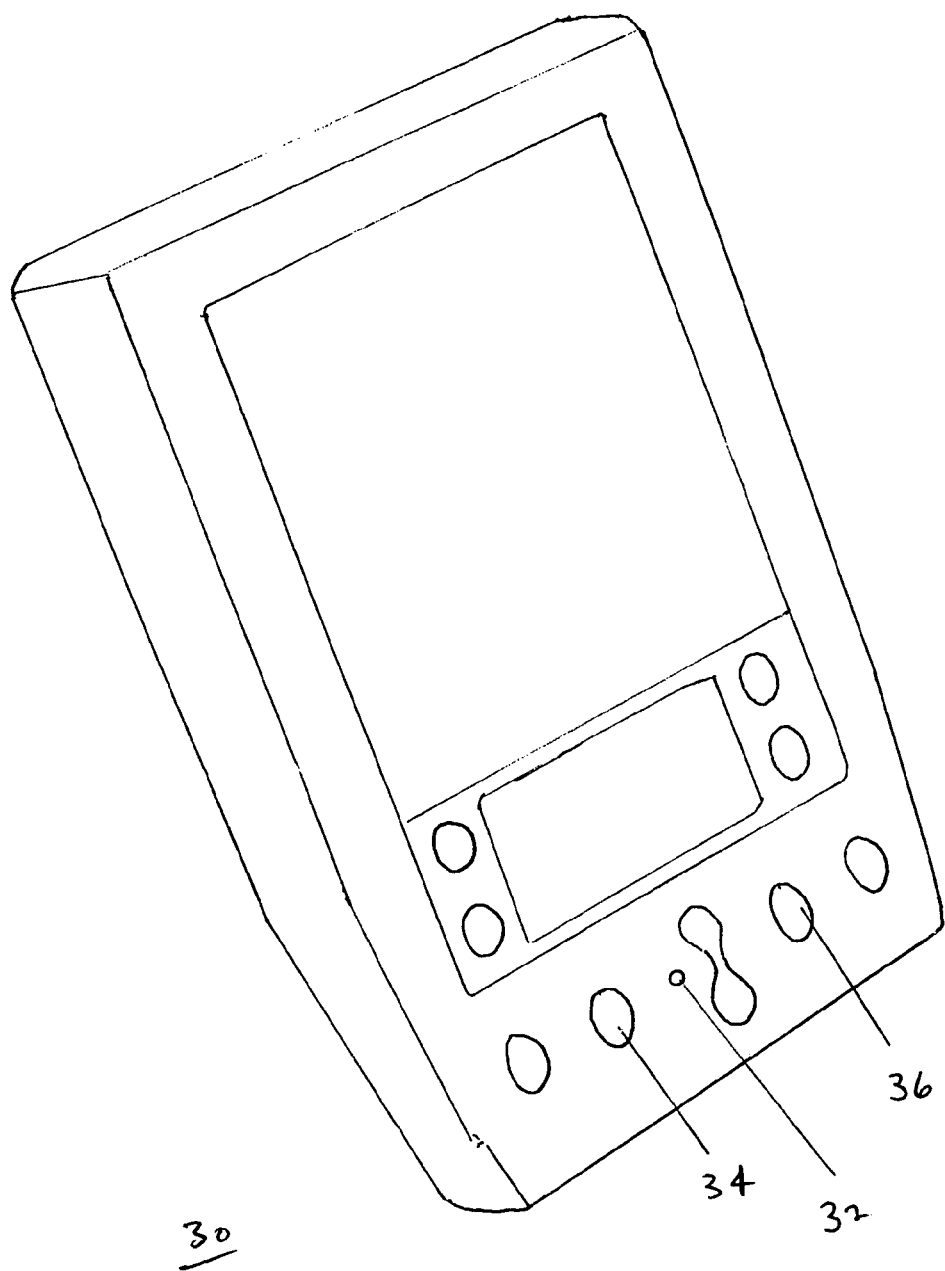
FIG. 3 shows a third exemplary embodiment of an apparatus for switching between the command-mode of operation and the text-mode of operation in a voice-recognition system.

FIG. 3 shows a third exemplary embodiment of an apparatus 30 for switching between the command-mode of operation and the text-mode of operation in voice-recognition systems according to the present invention. Apparatus 30 is implemented as a hand-held personal digital assistant/organizer such as a Palm Pilot. Apparatus 30 can be shaped like any hand-held organizer and can have any number of buttons and/or touch sensitive touch pads. Apparatus 30 is coupled to a computer by a cable. Alternatively, apparatus 30 can be a wireless device that that operates a computer at any frequencies permitting wireless communications.

Apparatus 30 includes a microphone 32 into which a user speaks, and a command-mode button 34 and a text-mode button 36, which respective buttons a user presses and holds depending on whether they want to issue commands to a computer or insert text into a software application. Apparatus 30 can also include buttons and/or a touchpad for controlling cursor movement and/or replicating the functions of a computer mouse button that works in a similar manner to command-mode/text-mode switch 12 described above.

Apparatus 10, 20 and 30 are implemented using conventional hardware and/or software which enable such devices to communicate with computers and other electronic appliances/devices. Apparatus 10, 20 and 30 are designed to operate computers using existing software operating systems, such as Microsoft Windows, and existing software applications, such as Microsoft Word or a web browser. Apparatus 10, 20 and 30 can communicate with computers over any frequencies that permit wireless, remote communications, including infrared and radio frequencies. Alternatively, apparatus 10, 20 and 30 can be coupled to the computer using a cable. Apparatus 10, 20 and 30 can each be used to sequentially operate multiple computers and/or appliances/devices. Apparatus 10, 20 and 30 can be used to operate computers and appliances/devices as long as the appropriate drivers and communication hardware and protocols are installed on such computers and appliances/devices.

Apparatus 10, 20 and 30 can be used with headgear such as goggles, monocles and glasses that are worn on the head to operate a computer. In addition, multiple persons each wearing a separate apparatus 10, 20 and 30 can simultaneously play a game or jointly operate an application on the computer.

The present invention can also be implemented using software alone without a mechanical switch, i.e., a software switch, wherein commands spoken by the user switch the voice-recognition system between the command-mode and the text-mode. For example, the software can be written to enable a user to affect such switching by speaking the words "command-mode" or "text-mode." Alternatively, other command words can be used to switch between modes. The software switch can be implemented in apparatus 10, 20, and/or 30 in addition to or in lieu of mechanical switches 12, 24, and 32 and 34, respectively.

The present invention can prompt a user to clarify a command when the system is unable to understand a spoken command. For example, if while in the command-mode the voice-recognition system does not understand a command spoken by the user, the system can prompt the user to clarify the command by selecting the intended command from one of a plurality of commands displayed on the computer display device that the system believes the user intended to issue. The user can use apparatus 10, 20 or 30 to select the intended command by issuing a spoken command. Alternatively, the user can select the intended command by pressing a button or touching a touch pad on apparatus 10, 20 or 30.

Figure 4:
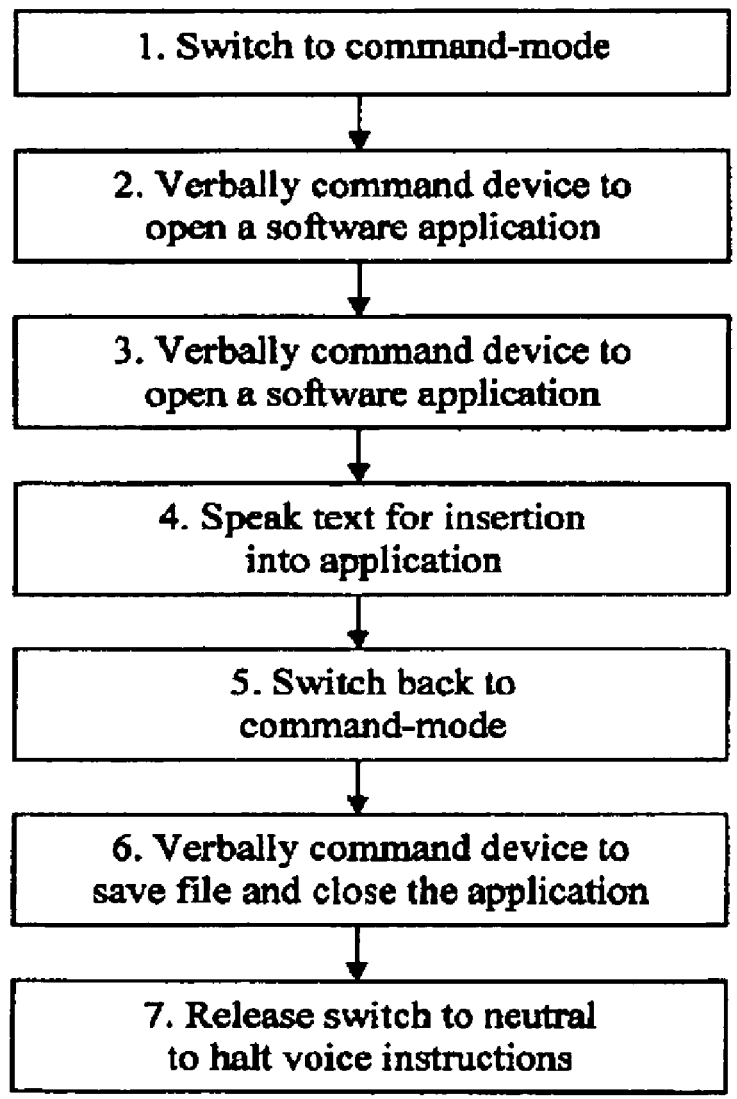
FIG. 4 shows a flowchart depicting the operation of the present invention.

FIG. 4 shows a flowchart depicting the operation of the present invention, wherein the system is implemented using apparatus 10. At step 1, a user slides switch 12 to the command-mode position to engage the voice-recognition system in the command-mode of operation thereby also turning on the microphone (not shown). At step 2, while holding switch 12 at the command-mode position, the user speaks into the microphone and commands the computer to open a software application. At step 3, the user slides switch 12 from the command-mode position to the text-mode position to engage the voice-recognition system in the text-mode of operation. The Microphone is only turned on when switch 12 is at either the command-mode or text-mode positions. The microphone is turned off when switch 12 is moved between the command-mode and text-mode positions. At step 4, while holding switch 12 at the text-mode position, the user speaks the text to be inserted into the software application. At step 5, the user slides switch 12 from the text-mode position back to the command-mode position. At step 6, while holding the switch at the command-mode position, the user commands the computer to save the file and close the application. At step 7, the user releases switch 12 which returns to its default position at which the microphone is also turned off. The steps for using the present invention with either apparatus 20 or 30 are similar to those just described.

The aforementioned components comprising apparatus 10, 20 and 30 can be fabricated from any material, and apparatus 10, 20 and 30 can be fabricated in any shape and any size. Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A method for switching between the command-mode and text-mode of operation in a voice-recognition system, the method comprising:
   operating the voice-recognition application in one of a command mode or a text-mode, wherein the command-mode is used to issue commands that are executable on a computer on which the voice-recognition system resides, and wherein the text-mode is used to insert text into a software application that is in use using the voice-recognition system;
   detecting a change in a switching device; and
   in response to detecting the change, operating the voice recognition application in the other of the command mode or the text mode; and
   wherein, after detecting the voice-recognition application as being in the command mode the method further comprises:
   recognizing one or more voice inputs entered by a user as one or more command;
   sequentially operating one or more of (i) multiple computers, (ii) multiple appliances, (iii) multiple devices, or (iv) multiple applications using the one or more commands.

2. An apparatus for switching between the command-mode and text-mode of operation in voice-recognition systems, wherein the apparatus is provided with a computer on which a voice-recognition system executes, and wherein the apparatus comprises:
   a switch having at least two positions, including a first position for using the voice-recognition system in a command-mode of operation and a second position for using the voice-recognition system in a text-mode of operation, wherein the voice-recognition application in the command-mode is used to sequentially issue commands, from the computer on which the voice-recognition system executes, to any one of two or more (i) computers, (ii) appliances, (iii) devices, or (iv) applications operated on the computer, and wherein the voice-recognition system in the text-mode is used to insert text an application that is in use.

3. The apparatus of claim 2, wherein the apparatus further comprises a microphone that enables the voice-recognition system to receive spoken commands and spoken text, wherein the microphone is configured to be switched on only when the switch is positioned for the voice-recognition system to be in either in the command-node or the text mode.

4. The apparatus of claim 2, wherein the switch is a mechanical switch moveable between the first position and the second position.

5. The apparatus of claim 4, wherein the switch is a spring-controlled slide switch.

6. The apparatus of claim 5, wherein the spring-controlled slide switch has a first operating position at which the microphone is turned off, a second operating position at which the microphone is turned on in the command-mode, and a third operating position at which the microphone is turned on in the text-mode.

7. The apparatus of claim 6, wherein the first position is a default position such that when a user slides the switch from the first position to the second position and then releases the switch, the switch returns to the first position, and when the user slides the switch from the first position to the third position and then releases the switch, the switch returns to the first position.

8. The apparatus of claim 2, further comprising at least one button that is moveable between the first position and the second position in order to switch between the command-mode and the text-mode.

9. The apparatus of claim 2, wherein the apparatus further comprises a computer mouse for enabling a user to operate the switch.

10. The apparatus of claim 2, wherein the apparatus further comprises a microphone on which the switch is provided.

11. The apparatus of claim 2, wherein the apparatus combines the functionality of both a microphone and a mouse/cursor control device in enabling the user to use the voice-recognition system and to operate the switch.

12. The apparatus of claim 2, wherein the apparatus further comprises a wireless device for enabling the user to operate the switch.

13. The apparatus of claim 2, wherein the apparatus comprises a cable for enabling the user to operate the switch.

14. The apparatus of claim 2, wherein a portion of the apparatus operates using an infrared frequency that indicates whether the switch has moved between the first position and the second position.

15. The apparatus of claim 2, wherein a portion of the apparatus operates at a radio frequency.

16. A system for switching between the command-mode and text-mode of operation in voice-recognition systems, wherein the system is provided on a computer having a microphone coupled to it to receive voice input from a user, wherein the system comprises:
   a voice-recognition software executable on the computer system, wherein the voice-recognition software is configured to enable the user to switch between a command-mode of operation and a text-mode of operation, wherein the voice-recognition software is operable in the command-mode to process voice input as commands and to sequentially issue commands interpreted from the voice inputs, from the computer on which the voice-recognition system executes, to any one of two or more (i) computers, (ii) appliances, (iii) devices, or (iv) applications residing on that computer, and wherein the voice-recognition software is operable in the text-mode to process voice input as text for a software application; and wherein the voice-recognition software includes a software-executable switch that is manually operable by the user to switch the voice-recognition software between the command-mode and the text-mode.

17. The system according to claim 16, wherein when the voice-recognition software (i) is in the command-mode and (ii) is unable to understand a spoken command, the voice-recognition software prompts the user to select an intended command from a plurality of commands, and wherein the voice-recognition software displays at least some of the plurality of commands to aid the user in selecting the intended command.

18. The system according to claim 16, wherein voice-recognition software is configured to detect the user speaking the intended command in response to the intended command being displayed as one of the plurality of commands that are displayed.

* * * * *

UNITED STATES PATENT AND TRADEMARK OFFICE
CERTIFICATE OF CORRECTION

PATENT NO.         : 7,035,805 B1
APPLICATION NO. : 09/631239
DATED              : April 25, 2006
INVENTOR(S)        : Stephen S. Miller It is certified that error appears in the above-identified patent and that said Letters Patent is hereby corrected as shown below:

Column 6, line 6, replace "insert text an application" with --insert text in an application--

Signed and Sealed this

Twenty-sixth Day of December, 2006

JON W. DUDAS
*Director of the United States Patent and Trademark Office*